(12) United States Patent
Hodebourg et al.

(10) Patent No.: US 9,121,511 B2
(45) Date of Patent: Sep. 1, 2015

(54) FLUID CIRCULATION VALVE HAVING AN AXIAL RETURN SPRING

(75) Inventors: Grégory Hodebourg, Sartrouville (FR); Sébastien Adenot, Pontoise (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 317 days.

(21) Appl. No.: 13/594,099

(22) Filed: Aug. 24, 2012

(65) Prior Publication Data

US 2013/0048895 A1 Feb. 28, 2013

(30) Foreign Application Priority Data

Aug. 25, 2011 (FR) ...................................... 1157510

(51) Int. Cl.
  *F16K 1/22* (2006.01)
  *F02M 25/07* (2006.01)
  *F02D 9/04* (2006.01)
  *F02D 9/10* (2006.01)
  *F16K 1/226* (2006.01)
  *F02B 3/06* (2006.01)

(52) U.S. Cl.
  CPC . *F16K 1/224* (2013.01); *F02D 9/04* (2013.01); *F02D 9/106* (2013.01); *F02M 25/0793* (2013.01); *F16K 1/2268* (2013.01); *F02B 3/06* (2013.01); *Y02T 10/121* (2013.01)

(58) Field of Classification Search
  USPC ................ 251/304, 305, 308, 313, 314, 214; 123/337, 188.6, 188.11, 188.13
  See application file for complete search history.

(56) References Cited

U.S. PATENT DOCUMENTS

| | | | | |
|---|---|---|---|---|
| 4,204,558 A | * | 5/1980 | Johnson et al. | 137/315.24 |
| 4,826,133 A | * | 5/1989 | Hiltebrand | 251/306 |
| 5,188,078 A | * | 2/1993 | Tamaki | 123/403 |
| 5,630,571 A | * | 5/1997 | Kipp et al. | 251/214 |
| 5,687,691 A | * | 11/1997 | Kaiser et al. | 123/337 |
| 2004/0187844 A1 | * | 9/2004 | Torii et al. | 123/337 |
| 2006/0059903 A1 | | 3/2006 | Gerards et al. | |
| 2008/0087248 A1 | * | 4/2008 | Saito et al. | 123/337 |

FOREIGN PATENT DOCUMENTS

| | | |
|---|---|---|
| DE | 19500344 A1 | 7/1996 |
| DE | 10105526 A1 | 8/2002 |
| DE | 202007006463 U1 | 9/2008 |

OTHER PUBLICATIONS

French Search Report issued in FR 1157510, mailing date Apr. 17, 2012 (2 pages).

* cited by examiner

*Primary Examiner* — Kevin Murphy
*Assistant Examiner* — Daphne M Barry
(74) *Attorney, Agent, or Firm* — Osha Liang LLP

(57) ABSTRACT

The valve 1 comprises:
  a body 2 having a through-channel 3 for the fluid,
  a rotary control shaft 4 having a seal for the channel, mounted in a passage 10 of the body,
  bearings 6, 7 provided in said passage between the body and the rotary control shaft, and
  axial locking of the shaft in said body.
According to the invention, the axial locking of the shaft is achieved by at least one cylindrical ring 15 mounted in a rotationally constrained manner on said shaft 4 and having an external surface 20 orientated towards one of the bearings 6 and contacting a transverse face thereof.

11 Claims, 2 Drawing Sheets

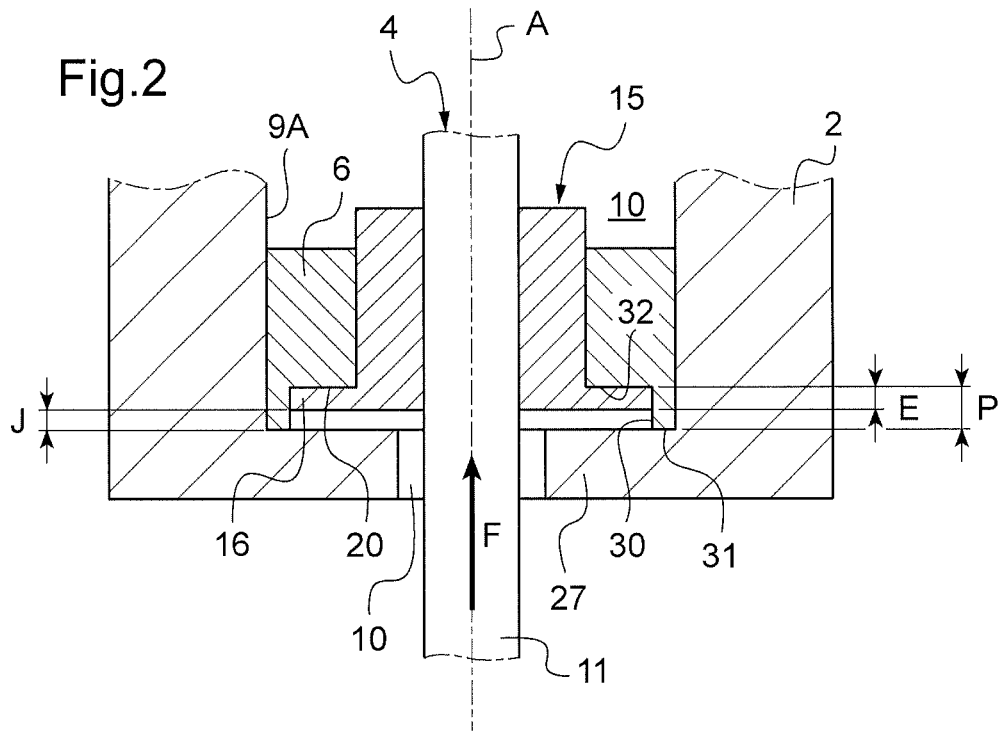
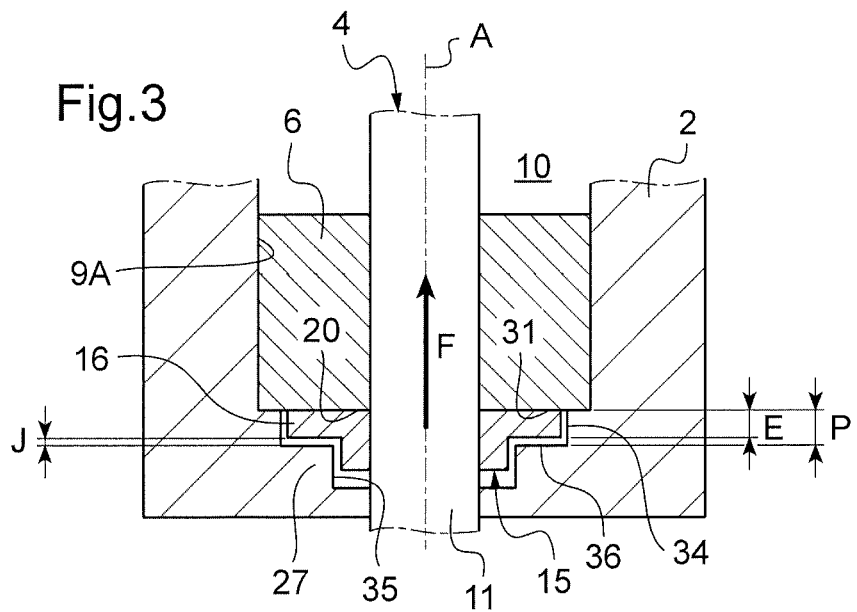

FLUID CIRCULATION VALVE HAVING AN AXIAL RETURN SPRING

The present invention relates to a fluid circulation valve, intended to be provided to vehicle internal combustion engines, whether petrol or diesel.

More particularly, although not exclusively, the valves which are the subject matter of the invention can be provided on the exhaust line of diesel engines particularly for nitrogen oxide (NOx) treatment purposes by redirecting some of the exhaust gases into the intake line, and are generally designated "EGR valve". Alternatively, they can also be provided upstream on the engine intake line measuring out, in this case, the intake of air therein. Other uses of the valve in engines or other fluid (gas or liquid) circulation equipment could be considered without exceeding the scope of the invention.

Valves are known which enable the flow rate of a fluid to be adjusted including:
- a body having a through-channel for the fluid,
- a rotary control shaft driving a sealing flap for the channel, said shaft being mounted in a passage of the body connecting with the channel, said shaft being subjected to the action of a return spring provided between the body and the shaft,
- bearings made of low-friction material which are provided in said passage between the body and the rotary control shaft, and
- axial locking of the shaft in said body.

Therefore, the shaft rotation control enables adjustment of the flow rate of the fluid circulating in the channel of the valve according the angular position given to the flap and, in the case of the EGR valve, the removal of some of the exhaust gases in order to redirect them to the engine intake line according to the present engine speed. With regard to the return spring, this enables the valve to be closed as a priority (the flap of the shaft sealing the channel) in the instance of electrical malfunction of the valve.

Generally, the control rotary shaft is axially locked by a U-shaped washer which is inserted, following arrangement of a bearing, into grooves provided in the body and the shaft, or by shrink fitting a ball bearing housed in a body receiving hole and carrying the shaft.

These axial lockings however have defects, in particular for the valves where the flap is very frequently used such as EGR valves.

Indeed, as a result of the axial force exerted on the shaft by the spring and the repeated and sustained operation of the valve at the engine speeds concerned, there appears, with use, wear between the U-shaped washer and the shaft at the corresponding groove and, therefore, friction points during the rotation of the shaft on the washer which can lead to untimely locking of the flap, as well as an axial clearance then bringing about an undesired contact between the flap and the channel.

Furthermore, the ball bearing solution requires a complex mounting tool and incurs significant cost.

The aim of the present invention is to overcome these disadvantages and relates to a fluid circulation valve wherein the axial locking design ensures, with use, operational reliability of the valve, even when there is a return spring present.

To this end, the fluid circulation valve, for example an EGR valve, as defined previously is characterised, according to the invention, in that the axial locking of the shaft is achieved by at least one cylindrical ring mounted in a rotationally constrained manner on said shaft and having an external surface orientated towards one of the bearings and contacting a transverse face thereof.

Therefore, thanks to the invention, the ring serves directly as an axial abutment for the shaft by contacting the corresponding bearing. Furthermore, the production of the valves is simplified by the removal of the receiving grooves (and therefore of the sharp edges generating wear and friction points) of the previous washers or the removal of the ball bearings and of the associated mounting tool, enabling the valve to be made reliable and the manufacturing costs to be reduced. Finally, the invention enables the valve rotary shaft to be axially stopped, limiting the friction and resulting wear.

Such a result is advantageously achieved when said shaft is subjected to the action of a return spring, provided between the body and the shaft. The ring contacts then the transverse face of the bearing concerned in the direction of the axial return to which the shaft is subjected by said spring.

Preferably, the ring has a radial flange defining said external surface orientated towards the bearing and contacting the transverse face thereof. Therefore, the outer radial flange makes it possible to provide a large surface for contact with the transverse face of the bearing, such that the axial force of the spring is distributed more over this contact surface which, as a result, helps to reduce wear. As the bearings are produced from a low-friction material, wear is reduced, or even almost non-existent, during the repeated operation of the rotary shaft, even in the instance of action by a return spring. In this manner, there is no occurrence of friction points and axial clearance.

In one embodiment, the flange of the ring is pressed directly against a corresponding flange which is at the end of the transverse face of the bearing, under the action of said spring. Thus, a large contact area is obtained, which helps optimise the distribution of the axial force of the spring and reduce wear.

A washer can be positioned opposite the other bearing, between the shaft and the body, to axially lock the shaft in the direction opposite the action of the spring. A single washer is sufficient since this is used in particular for mounting the shaft and is in the end almost not acted upon during the operation of the valve since the continuous force of the spring occurs in the opposite direction, with the ring.

In another embodiment, the flange of the ring engages in a countersinking provided in the corresponding transverse face of said bearing.

For example, mounted about the ring that is rigidly connected to the rotary shaft, is the bearing housed in said passage, with the radial flange of the ring which is received, with operational clearance, in the countersinking of the bearing while axially abutting the bottom of the countersinking, in the direction of the spring action, or a portion of the body defining the passage in the opposite direction. This embodiment does without the previous washer since the flange of the ring itself is held between the bottom of the countersinking and the body used as axial abutments in both directions.

In yet another embodiment, the flange of the ring engages in a countersinking provided in the body of the valve.

For example, the bearing is mounted then on the shaft opposite the ring, whereas the flange engages, with axial operational clearance, in the countersinking of a ring receiving passage hole, which is provided in a portion of the body which defines the passage, such that the flange can abut the bearing in the direction of the spring action or the bottom of the countersinking of the body, in the other direction.

Preferably, said ring is constrained to rotate with the shaft by shrink fitting, welding, etc, and the bearings are mounted by drive fitting, such as by shrink fitting, in the passage of the body.

To further minimise friction, the ring is produced from a material that is compatible with the material of the bearing and, by way of example, the bearings are produced from stainless steel or from cupro-nickel, bronze-type copper alloys.

The bearings can be straight, i.e. free of round support portions.

Each bearing can be obtained by means other than duplicate moulding.

Each bearing can be contained in the body, i.e. each bearing does not protrude externally beyond the outer contour of the body. The body can consist of a single piece.

It is possible for the stop ring and the spring not to be in contact with each other. The spring is, for example, arranged at the shaft end opposite that proximate to which the ring is arranged.

The washer can be configured such as to enable the shaft to be stopped in either direction.

The valve can be an EGR valve or a metering unit, for example.

The appended figures will illustrate clearly how the invention can be produced. In these figures, the same references designate similar elements.

FIG. 2 shows, as a cross-section, the axial locking of the rotary control shaft of the valve according to a second embodiment.

FIG. 3 shows, as a cross-section, the axial locking of the rotary control shaft of the valve according to a third embodiment.

Figure 1:
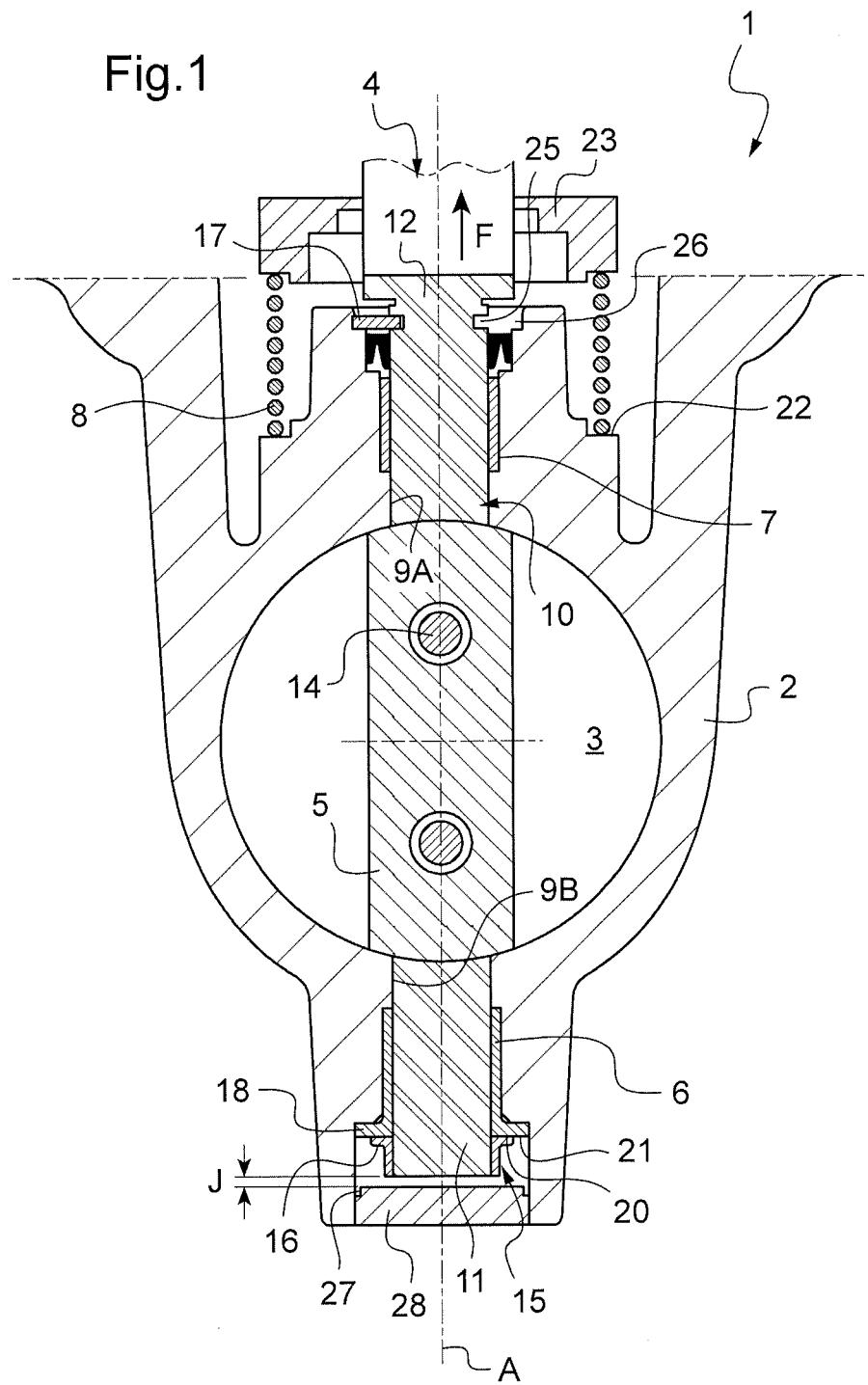
FIG. 1 is a partial cross-section of an embodiment of a fluid circulation valve having a return spring with, in accordance with the invention, axial locking of the rotary control shaft of the valve according to a first embodiment.

The fluid circulation valve 1 shown in FIG. 1 is, for example, the valve for recirculating engine exhaust gases, the aim of which was stated above, but the invention is in no way limited to this type of valve and generally relates to valves having a rotary drive shaft for the seal (flap) subjected to the action of a return spring.

The valve 1 includes, commonly, a body 2 inside which is provided a longitudinal channel 3, and which is intended to be mounted, by means of connections, on a branch conduit of the exhaust line of the engine such that the portion of the exhaust gases circulating in this branch conduit passes through the channel and is diverted to the intake line in order to be burnt again by the engine. The connections and the exhaust and intake lines have not been shown, as they are well known and are not part of the invention.

Received in the body 2 of the valve 1, which body is generally produced in a foundry, are mainly a rotary control shaft 4 with, rigidly connected therewith, a flap seal 5 for the channel 3, two bearings 6, 7 for the rotary movement of the shaft 4 in relation to the axis A thereof, a return spring 8 exerting a force on the shaft in a direction along the axis, and axial locking of the shaft 4.

More particularly, two aligned holes 9A, 9B are provided in the body 2, perpendicular to the longitudinal channel 3 while passing diametrically therethrough, in order to form a circular section passage 10, and receive the two bearings 6, 7 respectively. These are cylindrical with an annular section and are, in this example, press-mounted into the holes 9A, 9B such as to be positionally immobilised (rotationally and translationally) in relation to the body 2 of the valve. These fixed bearings 6, 7 are produced from a material that gives them appropriate self-lubricating and anticorrosive properties giving increased longevity. For this, they can be made from an alloy of copper and nickel or tin, or made from a stainless steel.

Received in these two bearings 6, 7 is the control shaft 4 which can therefore pivot freely about the axis A, by a slide fit provided between the shaft and the bearings. The shaft end 11, described as lower in relation to FIG. 1, engages in the corresponding bearing 6, whereas the other upper other end 12 passes through the other bearing 7 and opens to the outside of the body 2 of the valve 1 in order to be connected to the control unit as such of the shaft 4, which is not shown in FIG. 1 since it is a common type per se.

Rotationally connected to the control shaft 4 is the sealing flap 5 by means of fixing members 14, by welding, etc, which enables the flap to rotate with the shaft between two end positions wherein one, which is completely open (the plane of the flap being in the gas circulation direction, as in FIG. 1), allows the diverted portion of the exhaust gases to pass, and the other is closed against the side wall of the channel 3, optionally via a sealing which is not illustrated (the plane of the flap being perpendicular to the gas circulation direction, FIG. 1).

In accordance with the invention, axial locking of the shaft 4 is obtained, in the first embodiment illustrated in FIG. 1, by a cylindrical ring 15 directly mounted on the shaft and provided with an outer radial flange 16 which has a surface 20 contacting the bearing 6 as a result of the action of the return spring 8 (arrow F). Likewise, it is obtained in the opposite direction to the action of the spring by a washer 17 mounted on the shaft 4 and located on the side of the other bearing 7, as will be seen later.

In particular, the cylindrical ring 15 is rigidly connected to the end 11 of the shaft 4 by shrink fitting, which rotationally and translationally immobilises it in relation to the shaft in the chosen position. Any other means for providing such a connection could be envisaged. The radial flange 16 terminating an end of the ring 15 is intended to be pressed directly against an outer radial flange 18 also terminating the plain bearing 6 which is housed in the hole of the passage 9A and which carries, in turn, the end 11 of the shaft. It is therefore understood that the ring 15 serves as an axial abutment for the shaft 4 in the direction of the axial force F exerted by the spring 8, along the axis A, and that the contact between the ring 15 and the bearing 6 is established directly by the outer transverse faces 20, 21 of the respective flanges 16, 18 thereof, over a large contact area or surface.

In this manner, the axial force generated by the spring is distributed over this large contact area which therefore meets the desired requirements since contact occurs preferably thereon as the result of the continuous action of the spring during the lifespan of the valve. Furthermore, as the bearing 6 is made of a low-friction material and the ring 15 is made of a material compatible with the bearing, or even identical therewith, wear is almost nonexistent.

As regards the spring 8, it can be seen in FIG. 1 that the end 12 of the shaft 4 of the valve 1 extends beyond the washer 17 and located about the body 2 surrounding the bearing 7 is the spring 4, between an outer shoulder 22 of the body and a cap 23 linked to the shaft, arranged about it. It is understood therefore that the spring 8 exerts an action on the rotary shaft 4 of the body in the direction F which tends to make it exit the passage 10 in relation to the fixed bearings, the spring 8 being used for safety purposes in order to make it possible to close the seal of the valve in the instance of electrical fault. The cylindrical ring 15 having a flange 16, in direct contact with the bearing 6, therefore allows the previous problems of friction and wear, which consequently lead to the malfunction of the valve as stated above, to be avoided.

In relation to the washer 17 serving as an axial abutment in the opposite direction to the direction F along the axis A, it is in the shape of a U mounted in a peripheral groove 25 of the end 12 of the shaft and is applied in an enlargement 26 of the hole 9B of the passage, at the end of the shaft end and at a distance from the bearing 7.

Therefore, the U-shaped washer 17 is only in contact with the body 2 in order to axially stop the shaft 4 in this direction. It is noted that the bearing 7 simply has a constant annular shape and that the washer is orientated towards the control unit of the valve 7. As this U-shaped washer 17 serves particularly as a mounting axial abutment in the direction opposite to F, it is not subjected to the action of the spring 8 during the operation of the valve and, therefore, to any wear, unlike the ring 15 which serves as an operational axial abutment in the direction F. Indeed, as already stated, this ring is subjected to the continuous action of the spring and, thanks to the mounting thereof without machining on the rotary shaft 4 and to the radial flange 16 having a large surface 20 for contact directly with the low-friction bearing, it can support the rotation of the flap of the shaft during the operation of the valve, while preventing the problems of friction and wear.

Furthermore, operational axial clearance between the ring 15 and the bearing 6 thereof is adjusted by a mounting tool during shrink fitting of the ring on the shaft. During the operation of the valve 1, this operational clearance J disappears under the action of the spring 8 axially pulling on the shaft 4 sliding in the bearings, and is then located between the ring 15 (flush with the transverse face of the end 11 of the shaft 4) and a portion 27 of the body in the shape of a plug 28 sealing the passage 10.

In a second embodiment illustrated in FIG. 2, the cylindrical ring 15 having an outer radial flange 16 is rigidly connected to the rotary shaft 4, in the same manner as before, but one of the bearings, for example the bearing 6 by analogy with the preceding figure, is in turn mounted on the ring 15. Therefore, it is the ring itself which provides the guide function for the shaft, in addition to the function thereof of axially locking the latter. The bearing 6 is shrink fitted into the hole 9A of the passage 10, such that it is positionally immobilised in relation to the body 2, whereas the ring 15, which is rigidly connected to the shaft 4, is mounted by means of a slide fit in the bearing 6, in order to be able to slide and pivot in relation thereto.

The flange 16 is received then in a countersinking 30 which is provided in the end transverse face 31 of the bearing and which serves as a flange 18 for the bearing. The depth P of the countersinking is greater than the thickness E of the flange 16 such as to create, as a result of the difference, the axial clearance J. The face 31 is pressed against the, in this case edge, portion 27 of the body, in order to terminate the passage 10. The flange 16 of the ring 15, when the shaft 4 is not subjected to the action of the spring 8, can be pressed against this edge 27. However, when the shaft is subjected to the action of the spring, arrow F, as a result of the operation of the valve 1, the flange of the ring contacts, by means of the transverse face 20 thereof, the bottom 32 of the countersinking 30 (this bottom 32 corresponds to the preceding face 21 of the bearing), as shown in FIG. 2. The axial clearance J is located then between the flange and the edge of the body.

It is therefore understood that the bottom 32 of the countersinking and the edge 27 of the body act as operational axial abutments for the ring 15 having a flange 16, and, consequently, for the rotary shaft 4, removing the need for the washer 17 in the previous embodiment. Of course, the ring 15 and the flange 16 provide the same functions and advantages as above, i.e. a distribution of the force of the spring over a large contact area or surface and less, or almost no, wear via the direct contact thereof with the low-friction self-lubricated bearing, during the rotation of the flap of the shaft when the valve operates.

The third embodiment illustrated in FIG. 3 has a design that is close to the second embodiment. Indeed, the flange 16 of the ring 15 is housed, not in a countersinking of the bearing, but in a countersinking 34 provided in the edge 27 of the body. This countersinking 34 is at the end of the passage hole 35 of the body surrounding the lower end 11 of the shaft 4, and receives the ring 15. This has a reversed position to that of FIG. 2 and the flange 16 thereof axially abuts, via the face 20 thereof, against the transverse face 31 (corresponding to the face 21, FIG. 1) of the bearing 6 (which could be the bearing 7), under the action of the spring 8, arrow F, when the valve operates in the fashion shown in FIG. 3. Alternatively, the flange abuts against the bottom 36 of the countersinking 34 during mounting for example. The geometric conditions between the depth P of the countersinking, the thickness E of the flange 16 and the resulting clearance J (difference between P and E) are identical to the embodiment of FIG. 2.

However, the bearing 6 is mounted about the shaft 4, as in the first embodiment (FIG. 1), such that the ring 15 no longer provides the additional function of guiding the shaft, but the main function thereof of axially locking the latter, on this occasion in both directions in relation to the axis A. The ring has a reduced axial length compared to the embodiment thereof in FIG. 2.

As an alternative, a second cylindrical ring 15 can be provided in contact with the other bearing 7, in particular if the shaft is strongly acted upon axially both in the direction of the arrow F and in the opposite direction.

The operational reliability of the valve described in these various embodiments is therefore guaranteed, with use, by mounting the ring having a flange on the rotary shaft having a seal and the direct contact thereof with the corresponding bearing under the action of the return spring.

The invention claimed is:

1. A fluid circulation valve comprising:
   a body comprising a through-channel for fluid;
   a rotary control shaft comprising a seal for the through-channel, mounted in a passage of the body connecting with the through-channel;
   bearings provided in said passage between the body and the rotary control shaft;
   axial locking of the shaft in said body, the axial locking of the shaft being achieved by at least one cylindrical ring mounted in a rotationally constrained manner on said shaft and having an external surface orientated towards one of the bearings and contacting a transverse face of the bearing; and
   a return spring provided between the body and the shaft and subjecting the shaft to a return force, the return spring and the cylindrical ring not contacting one another.

2. The valve according to claim 1, wherein the cylindrical ring contacts the transverse face of the bearing concerned in the direction of the axial return to which the shaft is subjected by said spring.

3. The valve according to claim 2, wherein the cylindrical ring has a radial flange defining said external surface orientated towards the bearing and contacting the transverse face of the bearing.

4. The valve according to claim 3, wherein the radial flange of the cylindrical ring is pressed directly against an outer radial flange which is at an end of the transverse face of the bearing, under the action of said spring.

5. The valve according to claim 3, wherein the radial flange of the cylindrical ring engages in a countersinking provided in the corresponding bearing.

6. The valve according to claim 5, wherein mounted about the ring that is rigidly connected to the rotary shaft, is the bearing housed in said passage, with the radial flange of the cylindrical ring which is received, with operational clearance, in the countersinking of the bearing while axially abutting the bottom of the countersinking, in the direction of the spring action, or a portion of the body defining the passage in the opposite direction.

7. The valve according to claim 3, wherein the radial flange of the cylindrical ring engages in a countersinking provided in the body.

8. The valve according to claim 7, wherein the bearing is mounted on the shaft opposite the cylindrical ring, whereas the radial flange engages, with axial operational clearance, in the countersinking of a ring receiving passage hole, which is provided in a portion of the body which defines the passage, such that the radial flange abuts the bearing in the direction of the spring action or the bottom of the countersinking of the body, in the other direction.

9. The valve according to claim 1, wherein each bearing does not protrude beyond the outer contour of the body.

10. The valve according to claim 1, wherein said cylindrical ring is constrained to rotate with the shaft by one of shrink fitting and welding.

11. The valve according to claim 1, wherein the bearings are mounted by drive fitting in the passage of the body.

* * * * *